United States Patent [19]

Tomagou et al.

[11] Patent Number: 4,981,947

[45] Date of Patent: Jan. 1, 1991

[54] AROMATIC SULFIDEAMIDE POLYMER AND METHOD FOR PRODUCING THE SAME

[75] Inventors: Satoshi Tomagou; Toshikazu Kato; Hiroshi Inoue; Kensuke Ogawara, all of Mie, Japan

[73] Assignee: Tosoh Corporation, Yamaguchi, Japan

[21] Appl. No.: 288,342

[22] Filed: Dec. 22, 1988

[30] Foreign Application Priority Data

Dec. 24, 1987 [JP] Japan ................... 62-325277

[51] Int. Cl.$^5$ ............................................. C08G 75/02
[52] U.S. Cl. ..................... 528/364; 528/125; 528/183; 528/337
[58] Field of Search ............... 528/364, 337, 125, 183

[56] References Cited

U.S. PATENT DOCUMENTS 4,818,809  4/1989  Ishikawa et al. ................ 528/337

FOREIGN PATENT DOCUMENTS 0261988  9/1987  European Pat. Off. .
60-226528  11/1985  Japan .

Primary Examiner—Harold D. Anderson
Attorney, Agent, or Firm—Sughrue, Mion, Zinn, Macpeak & Seas

[57] ABSTRACT

A class of amide group-containing aromatic dihalide compounds are sulfidized to provide a novel class of aromatic sulfideamide polymers increased in crystalline melting point ($T_m$). The polymers exhibit excellent resistance to high temperatures, resistance to solvents, flame-retardant properties and improved mechanical properties.

5 Claims, 2 Drawing Sheets

AROMATIC SULFIDEAMIDE POLYMER AND METHOD FOR PRODUCING THE SAME

This invention relates to a novel aromatic sulfideamide polymer and a process for production of the novel polymer. The polymers according to the invention have a chemical structure in which phenylene and alkylene groups are alternately bonded via an amide group and a thioether group. The polymers are useful as materials for producing articles exhibiting improved properties such as excellent resistance to high temperatures, flame-retardant properties, resistance to solvents, good mechanical properties, etc.

Polyphenylene sulfide which is a polymeric compound comprising phenylene groups linked to each other via a thioether group is well known in the art. This polymer has such properties as good flame-retardancy, low moisture absorption, high dimensional stability, etc. However, since this type of polymer exhibits a relatively low heat distortion temperature (HDT) of 260° C. (GF 40%; i.e. where containing 40% by weight of glass fibers) and a crystalline melting point of 281° C., its usefulness in applications where high resistance to heat is required is inevitably limited. Consequently there has been a demand in the art for the developement of polyphenylene sulfide materials having higher crystalline melting points.

A polymer substance containing thioether, phenylene and amide groups in the macromolecular backbone, i.e. a polymer of aromatic polythioether amide, and a process for production thereof are described in Japanese Patent Public Disclosure (KOKAI) No. 60-226528. This polymer substance presents some problems in practice because it has a rather low softening point, is soluble in organic solvents such as dimethyl sulfoxide or N-methyl-2-pyrrolidone and exhibits poor resistance to chemicals. Additionally the synthesis of thiol group-containing monomers to be used in the preparation of the polymer is so expensive that production of the polymer is not feasible from the economic viewpoint.

An object of the present invention, therefore, is provide to a novel aromatic sulfideamide polymer substance comprising a commercially available, inexpensive aliphatic moiety in the repeating units and which is improved in terms of resistance to high temperatures, resistance to solvents and mechanical properties.

A further object of the present invention is to provide a process for production of such a novel polymer substance.

According to one aspect of the present invention, there is provided a novel aromatic sulfideamide polymer compound or compounds which comprise(s) repeating structural units represented by the following formula (I) and/or (II):

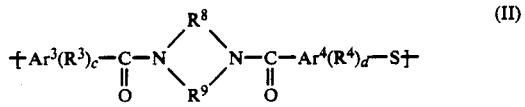

wherein $Ar^1$, $Ar^2$, $Ar^3$ and $Ar^4$ each represent an aromatic ring; $R^1$, $R^2$, $R^3$, $R^4$, $R^5$ and $R^6$, which may be the same or different, each represent an alkyl group having 1 to 20 carbon atoms, a cycloalkyl group having 3 to 20 carbon atoms, an aryl group having 6 to 20 carbon atoms, an alkoxy group having 1 to 20 carbon atoms, an acyl group having 2 to 20 carbon atoms or an arylalkyl group having 7 to 20 carbon atoms, each of $R^5$ and $R^6$ optionally being hydrogen; a, b, c and d, which may be the same or different, each represent an integer of from 0 to 4; and $R^7$, $R^8$ and $R^9$, which may be the same or different, each represent an alkylene group having 1 to 20 carbon atoms, said polymer compound or compounds having a logarithmic viscosity $[\eta]$ of 0.02 to 2.00, as determined by measuring the relative viscosity of polymer dissolved in a concentrated sulfuric acid solvent (specific gravity of 1.84) at 30° C. and at a polymer concentration of 0.5 g/100 ml and computing the result in accordance with the equation:

$$[\eta] = \ln \frac{\text{(relative viscosity)}}{\text{(polymer concentration)}}.$$

According to another aspect of the present invention, there is provided a process for production of an aromatic sulfideamide polymer compound or compounds comprising the above defined repeating units (I) and/or (II) [in which the ratio of units (I) to units (II) ranges from 100:0 to 0:100]: said process comprising the step of sulfidizing one or more amide group-containing dihalide compounds having the following general formula (III) and/or (IV) with a sulfidizing agent in an organic polar solvent;

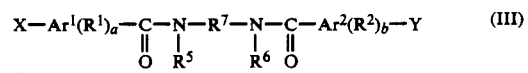

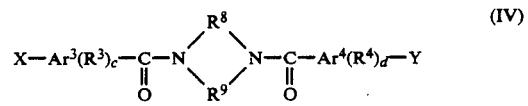

wherein $Ar^1$, $Ar^2$, $Ar^3$ and $Ar^4$ each represent an aromatic ring; $R^1$, $R^2$, $R^3$, $R^4$, $R^5$ and $R^6$, which may be the same or different, each represent an alkyl group having 1 to 20 carbon atoms, a cycloalkyl group having 3 to 20 carbon atoms, an aryl group having 6 to 20 carbon atoms, an alkoxy group having 1 to 20 carbon atoms, an acyl group having 2 to 20 carbon atoms or an arylalkyl group having 7 to 20 carbon atoms, each of $R^5$ and $R^6$ optionally being hydrogen; a, b, c and d, which may be the same or different, each represent an integer of from 0 to 4; $R^7$, $R^8$ and $R^9$, which may be the same or different, each represent an alkylene group having 1 to 20 carbon atoms; and X and Y, which may be the same or different, each represent a halogen.

BRIEF DESCRIPTION OF THE DRAWINGS

The accompanying

Figure 1:
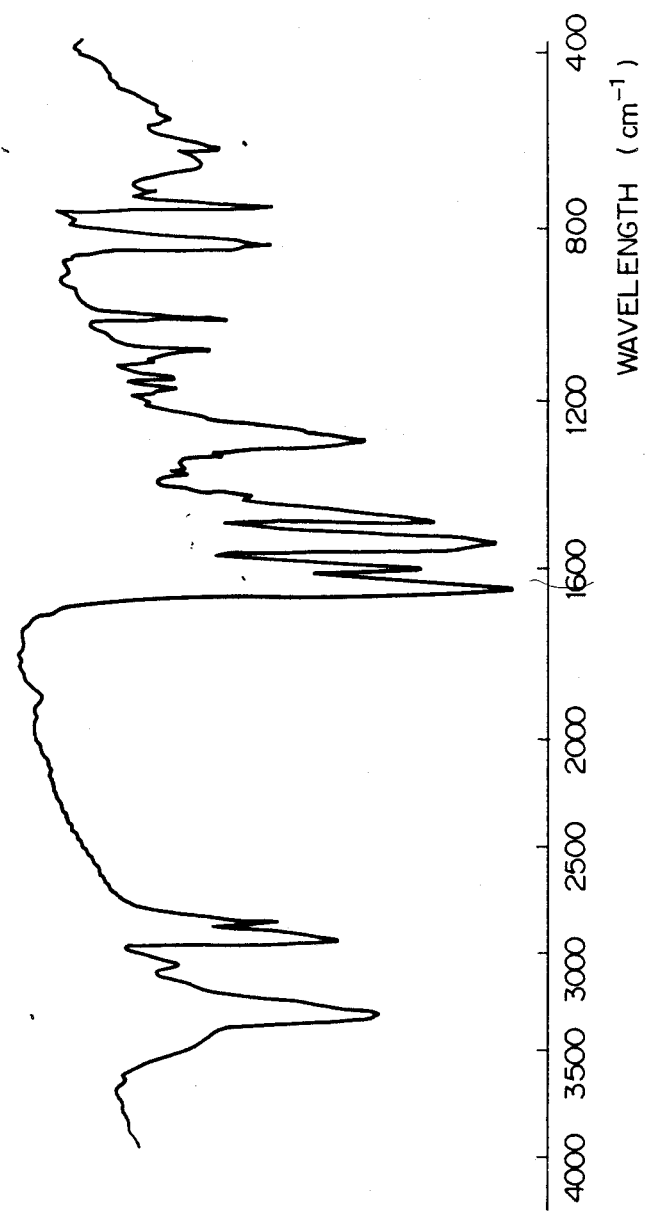
FIGS. 1 and 2 show an IR spectrum (wave length: 400-4000 cm$^{-1}$) and an X-ray diffraction pattern (X-ray intensity: counts/angle: 10°-40°) of the polymer obtained in Example 1, respectively.

The invention will now be described in more detail.

Examples of groups $Ar^1$, $Ar^2$, $Ar^3$ and $Ar^4$ in the amide group-containing dihalide compounds which may be used in the invention include:

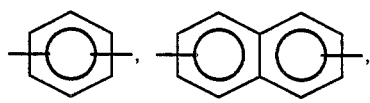
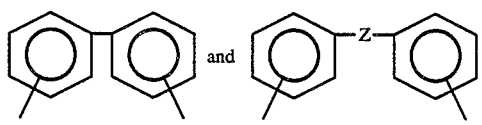
where Z represents —O—, —S—, —SO$_2$—, —CO—, —CH$_2$— or —C(CH$_3$)$_2$—. The groups may be the same or different in one compound.
Examples of particularly preferred dihalide compounds (III) and (IV) for use in the present invention include:
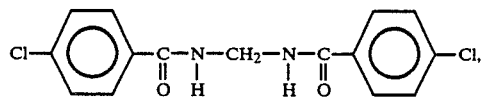
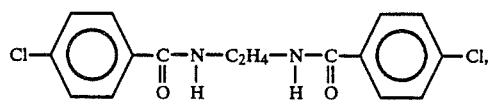
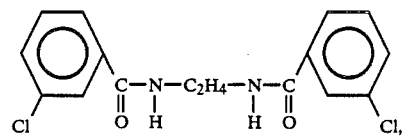
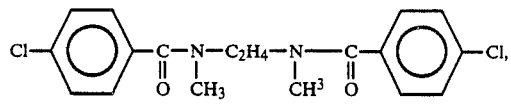
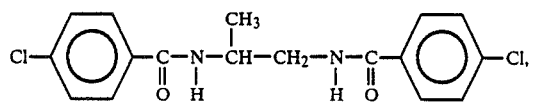
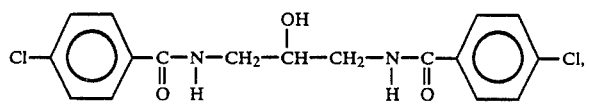
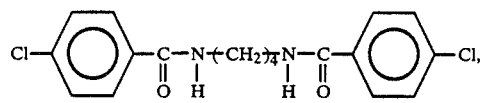
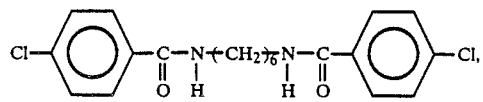
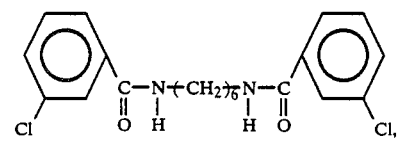
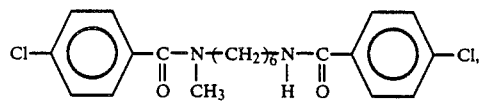

-continued

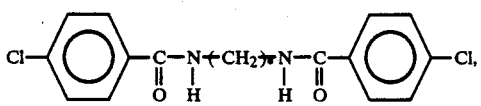

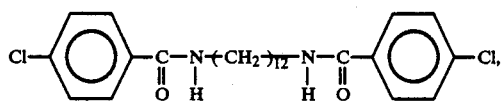

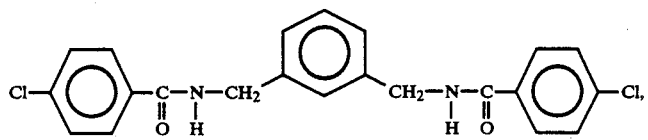

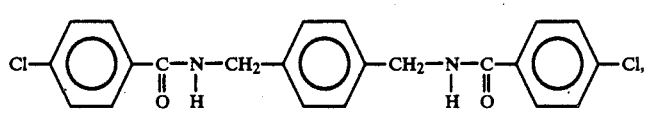

(cis or trans)

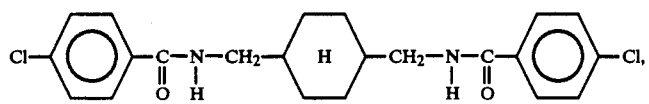

(cis or trans)

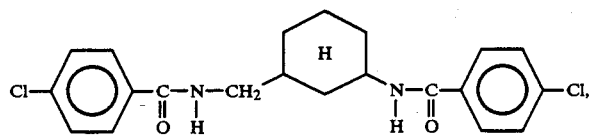

(cis or trans)

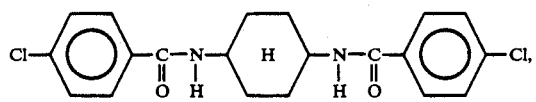

(cis or trans)

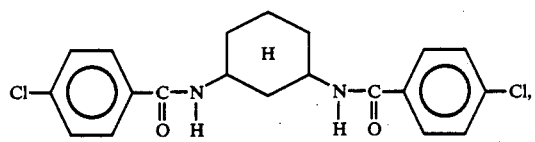

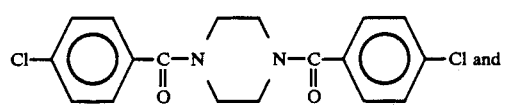

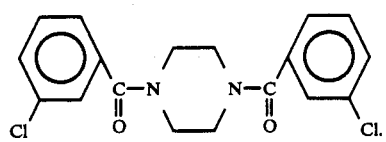

It is preferred that the amide group-containing dihalide compounds contain bonds at the para positions if it is mainly desired to improve the thermal resistance properties of the product polymers. On the other hand, if it is desired to improve the solubility and molding properties of the sulfideamide polymer products, the dihalide compounds may contain bonds at the metha positions and/or at the ortho positions, or may be branched.

The amide group-containing dihalide compounds may be synthesized by the conventional amide linkage formation technique. A typical example of synthesis is a process in which a corresponding halogen-containing aromatic carbonyl chloride is reacted with a corresponding aliphatic diamine.

The organic polar solvents used in the process of the present invention are preferably aprotic ones and ones which are stable in the presence of alkalis at elevated temperatures. Examples of the preferred solvents include N,N-dimethyl acetamide (DMA), N-ethyl-2-pyrrolidone, hexamethyl phosphoric triamide (HMPA), dimethyl sulfoxide (DMSO), N-methyl-2-pyrrolidone (NMP), 1,3-dimethyl imidazolidinone.

The sulfidizing agents which may be used in the process include alkali metal sulfides, combinations of hydrogen sulfide with alkali metal bases, and combinations of alkali metal hydrosulfides with alkali metal basis. The alkali metal sulfides and hydrosulfides may be used as hydrates (from 0.5 to 10 molar equivalents). The sulfidizing agents may be prepared in situ prior to introduction of the dihalide compound of the general formula (III) and/or (IV) into the reaction system. Of course, the sulfidizing agent may be prepared outside the reaction system and then introduced to the system. It is preferred that, before the sulfidizing agent is introduced for commencement of the polymerization in the reaction system, the content of water in the system should be reduced to a level of less than 2.5 molar equivalents per equivalent of the sulfidizing agent to be introduced.

Among the available sulfidizing agents, sodium sulfide, sodium hydrosulfide in conjunction with sodium hydroxide, and hydrogen sulfide in conjunction with sodium hydroxide are preferred.

In the polymerization, a phase transfer catalyst such as a crown-ether compound, phosphor salt or an ammonium salt compound as well as an assistant such as an alkali metal carboxylate may be used to effectively increase the molecular weight of the resulting polymer.

The polymerization is effected at a temperature of about 150°–300° C., preferably 180°–280° C., for a period of about 0.5–24 hours, preferably 1–12 hours.

The preferred molar ratio of the dihalide compound (III) and/or (IV) to the sulfidizing agent used in the present process ranges from 0.9:1.0 to 1.1:1.0.

The quantity of solvent used in the process may be such that the reaction system will contain 7–50%, preferably 10–40%, by weight of the product polymer upon completion of the polymerization.

The product polymer may be recovered by conventional methods, such as vacuum distillation, flash-off, and reprecipitation with organic solvents or water. The isolated product polymer may be washed with any suitable organic solvent or water and then dried.

Generally, the aromatic sulfideamide polymers according to the present invention have a logarithmic viscosity in the range of 0.02 to 2.00, as measured at a concentration of 0.5 g/100 ml in concentration sulfuric acid at a temperature of 30° C. Polymers having viscosities of 0.05 to 2.00 are preferred.

The aromatic polysulfideamide polymers of the invention may be advantageously chain-extended and/or cross-linked and/or branched by heating in an oxidative atmosphere, such as air or oxygen-enriched air.

Where the polymers are molded or otherwise shaped, they may contain various filler materials. Examples of suitable filler materials include (a) fiber fillers, such as glass fibers, carbon fibers, boron fibers, aramid fibers, alumina fibers, etc. and (b) inorganic fillers, such as mica, talc, clay, graphite, carbon black, silica, asbestos, molybdenum disulfide, magnesium oxide, calcium oxide, etc.

As shown in the following Examples, the polymers of the present invention exhibit, on IR analysis, absorptions around 1090 cm$^{-1}$ (caused by thioether linkages), around 1640 cm$^{-1}$ (caused by carbonyl groups in amide linkages) and around 3320 cm$^{-1}$ and 1540 cm$^{-1}$ (both caused by amino groups in amide linkages). These IR data confirm that the present polymers have the structural repeating units (I) and/or (II).

The invention is illustrated in detail but not limited by the following Examples.

Since most of the polymers according to the invention are only soluble in some special solvents such as concentrated sulfuric acid or an N-methyl-2-pyrrolidone/lithium chloride (95/5 by weight) mixture, and are only sparingly soluble or insoluble in common organic solvents, it is not readily possible to determine the average molecular weight of the present polymers by a conventional method. Hence, the logarithmic viscosity value [$\eta$] of a polymer is herein employed as a measure of the molecular weight of that polymer. The logarithmic viscosity value [$\eta$] is obtained by measuring the relative viscosity of polymer dissolved in a concentrated sulfuric acid solvent at 30° C. and at a polymer concentration of 0.5 g/100 ml and calculating the result in accordance with the equation:

$$[\eta] = \ln \frac{\text{(relative viscosity)}}{\text{(polymer concentration)}}.$$

EXAMPLE 1

A 500 ml autoclave was charged with Na$_2$S·2.7H$_2$O (0.04 moles) and N-methyl-2-pyrrolidone (NMP) 150 ml and heated to a temperature of 200° C. with stirring so as to dehydrate the mixture. By this dehydration, 1.26 g of water containing 4.31% of NMP was distilled off. After cooling the reaction system down to 100° C., a dichloride

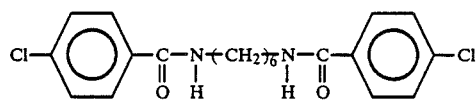

(0.04 moles) was added together with an additional 50 ml of NMP. The system was shielded and heated to 250° C. At this temperature, the polymerization was allowed to proceed for 6 hours.

At the end of the polymerization period, the system was cooled and methanol was added to precipitate out the product polymer. The mixture was filtered. The filter cake was repeatedly washed with warm water and filtered and then washed with methanol and dried to give a light gray powdery polymer product (10 g; corresponding to a yield of 70.6%).

The polymer had a logarithmic viscosity of 0.16 (as measured in H$_2$SO$_4$ at a concentration of 0.5 g/100 ml at 30° C.). The polymer as such was not melt-moldable, but was soluble in, for example, concentrated sulfuric acid or NMP/LiCl mixture (such a solution could be used in casting to give a film).

The infra-red absorption spectrum of the polymer showed absorptions at 1090 cm$^{-1}$ (thioether linkage) and 3350, 1640 and 1544 cm$^{-1}$ (amide linkage, respectively) (see FIG. 1).

Figure 2:
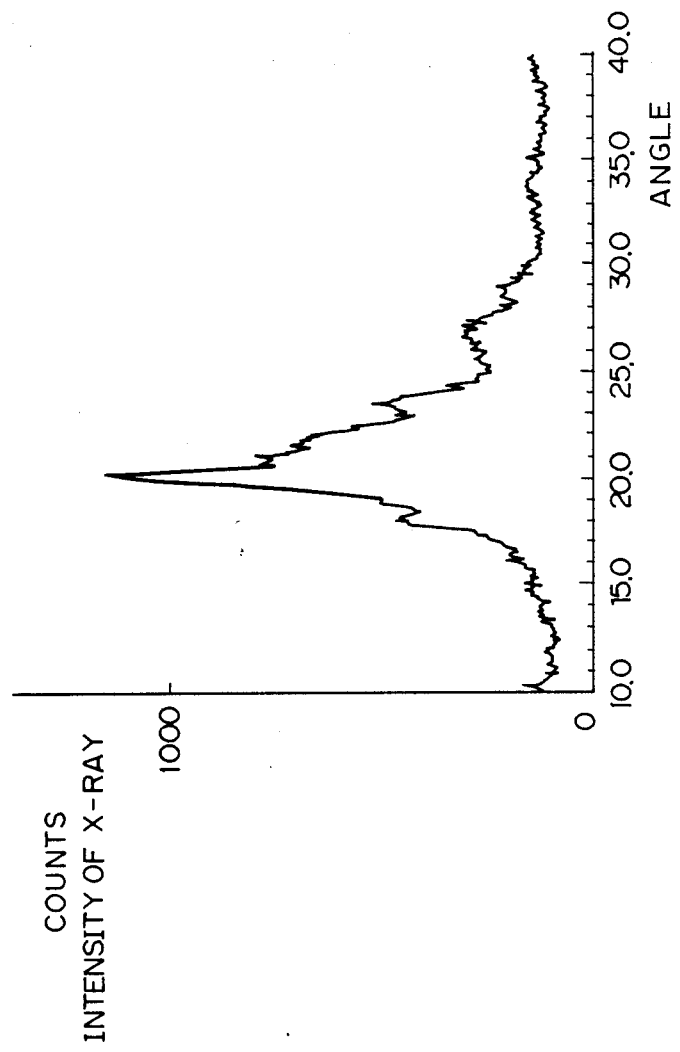

Results of the elemental analysis are listed below:
Found (wt %): C 66.9, H 5.8, N 7.7, S 8.6
Theoretical (wt %): C 67.8, H 6.2, N 7.9, S 9.0
X-ray diffraction confirmed that the product sulfideamide polymer was crystalline in nature (see FIG. 2).

The polymer showed a decomposition temperature of 425° C. but did not show a definite melting point.

EXAMPLES 2–7

The apparatus and procedure of Example 1 was used to polymerize various dihalide compounds. The polymers obtained in all the cases were crystalline.

EXAMPLE 2

The following dihalide compound was employed:

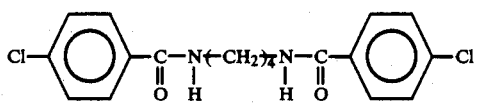

Yield: 11.4 g (87.3%)
Logarithmic viscosity: 0.11 (measured with a 0.5 g/100 ml solution in $H_2SO_4$ at 30° C.)
IR: 1090 cm$^{-1}$ (thioether linkage), 3320; 1617; 1541 cm$^{-1}$ (amide linkage)
Elemental analysis:
Found (wt %): C 65.5, H 5.4, N 8.3, S 8.8
Theoretical (wt %): C 66.2, H 5.5, N 8.6, S 9.8 Decomposition temperature: 413° C. (with no definite melting point) Soluble in concentrated sulfuric acid, NMP/LiCl mixture, etc. Insoluble in methanol, DMF, DMSO, NMP, etc.

EXAMPLE 3

The following dihalide compound was employed:

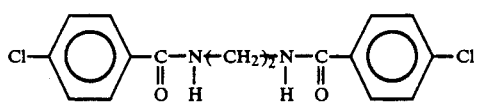

Yield: 9.7 g (81.3%)
Logarithmic viscosity: 0.08 (measured with a 0.5 g/100 ml solution in $H_2SO_4$ at 30° C.)
IR: 1070 cm$^{-1}$ (thioether linkage), 3320; 1642; 1552 cm$^{-1}$ (amide linkage) Elemental analysis:
Found (wt %): C 64.0, H 4.6, N 9.2, S 8.9
Theoretical (wt %): C 64.4, H 4.7, N 9.4, S 10.7
Decomposition temperature: 351° C. (with no definite melting point) Soluble in concentrated sulfuric acid, NMP/LiCl mixture, etc. Insoluble in methanol, DMF, DMSO, etc.

EXAMPLE 4

The following dihalide compound was employed:

Yield: 10.4 g (80.1%) Logarithmic viscosity: 0.10 (measured with a 0.5 g/100 ml solution in $H_2SO_4$ at 30° C.)

IR: 1075 cm$^{-1}$ (thioether linkage), 1642 cm$^{-1}$ (carbonyl group)
Elemental analysis:
Found (wt %): C 65.0, H 4.9, N 8.5, S 8.1
Theoretical (wt %): C 66.7, H 5.0, N 8.6, S 9.9
Decomposition temperature: 432° C. (with no definite melting point) Soluble in concentrated sulfuric acid, NMP/LiCl mixture, etc. Insoluble in methanol, DMF, DMSO, etc.

EXAMPLE 5

The following dihalide compound was employed:

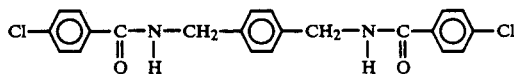

Yield: 14.6 g (97.9%) Logarithmic viscosity: 0.09 (measured with a 0.5 g/100 ml solution in $H_2SO_4$ at 30° C.)
IR: 1090 cm$^{-1}$ (thioether linkage), 3320; 1642; 1542 cm$^{-1}$ (amide linkage) Elemental analysis:
Found (wt %): C 68.9, H 4.8, N 7.3, S 7.7
Theoretical (wt %): C 70.1, H 4.8, N 7.5, S 8.5 Decomposition temperature: 384° C. (with no definite melting point) Soluble in concentrated sulfuric acid, NMP/LiCl mixture, etc. Insoluble in methanol, DMF, DMSO, etc.

EXAMPLE 6

The following dihalide compound was employed:

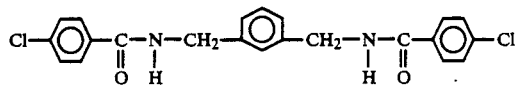

Yield: 14.9 g (99.0%) Logarithmic viscosity: 0.09 (measured with a 0.5 g/100 ml solution in $H_2SO_4$ at 30° C.)
IR: 1080 cm$^{-1}$ (thioether linkage), 3300; 1640; 1542 cm$^{-1}$ (amide linkage)
Elemental analysis:
Found (wt %): C 69.6, H 4.7, N 7.3, S 8.0
Theoretical (wt %): C 70.1, H 4.8, N 7.5, S 8.5
Decomposition temperature: 387° C. (with no definite melting point) Soluble in concentrated sulfuric acid, NMP/LiCl mixture, NMP, DMSO, DMA, etc. Insoluble in methanol, m-cresol, pyridine, etc.

EXAMPLE 7

The following dihalide compounds were employed in admixture:

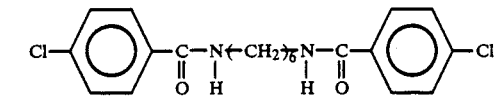

(0.02 moles)

and

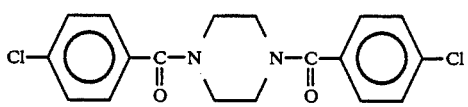

(0.02 moles)

Yield: 11.2 g (82.3%)

Logarithmic viscosity: 0.11 (measured with a 0.5 g/100 ml solution in H₂SO₄ at 30° C.)

IR: 1080 cm⁻¹ (thioether linkage), 3350; 1642; 1545 cm⁻¹ (amide linkage)

Elemental analysis:

Found (wt %): C 66.9, H 5.5, N 8.3, S 9.1

Theoretical (wt %): C 67.2, H 5.6, N 8.3, S 9.5 Decomposition temperature: 427° C. (with no definite melting point) Soluble in concentrated sulfuric acid, NMP/LiCl mixture, etc. Insoluble in methanol, DMF, etc.

From the above description, it will be appreciated that the present invention provides a novel class of aromatic sulfideamide polymers which may be synthesized from commercially available materials by a simple process. It is expected that the polymers will find a wide range of applitions as engineering plastics because of their excellent heat resistance properties and processability.

What is claimed is:

1. A sulfideamide polymer which comprise(s) repeating structural units represented by the following formula (I), (II) or formula (I) and (II):

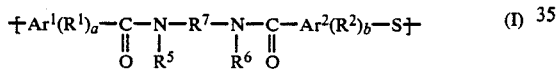

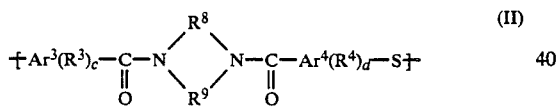

wherein Ar¹, Ar², Ar³ and Ar⁴ each represent an aromatic ring; R¹, R², R³, R⁴, R⁵ and R⁶, which are the same or different, each represent an alkyl group having 1 to 20 carbon atoms, a cycloalkyl group having 3 to 20 carbon atoms, an aryl group having 6 to 20 carbon atoms, an alkoxy group having 1 to 20 carbon atoms, an acyl group having 2 to 20 carbon atoms or an arylalkyl group having 7 to 20 carbon atoms, each of R⁵ and R⁶ optionally being hydrogen; a, b, c and d, which are the same or different, each represent an integer of from 0 to 4; and R⁷, R⁸, and R⁹, which are the same or different, each represent an alkylene group having 1 to 20 carbon atoms, said polymer having a logarithmic viscosity [η] of 0.02 to 2.00, as determined by measuring the relative viscosity of polymer dissolved in a concentrated sulfuric acid solvent at 30° C. and at a polymer concentration of 0.5 g/100 ml and computing the result in accordance with the equation:

$$[\eta] = \ln \frac{\text{(relative viscosity)}}{\text{(polymer concentration)}}.$$

2. A polymer as claimed in claim 1, in which groups Ar¹, Ar², Ar³ and Ar⁴ are each selected from

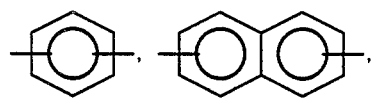

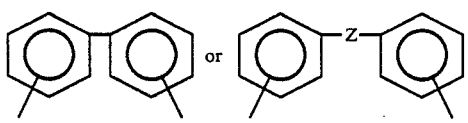

where Z represents —O—, —S—, —SO₂—, —CO—, —CH₂— or —C(CH₃)₂—.

3. A polymer as claimed in claim 1, in which the logarithmic viscosity is in the range of 0.05 to 2.00.

4. A composition comprising a sulfideamide polymer as claimed in claim 1, further comprising one or more filler materials.

5. A composition comprising a sulfideamide polymer and one or more filler materials, which aromatic sulfideamide polymer is produced by the process comprising the step of sulfidizing one or more amide group-containing dihalide compounds having the following general formula (III), (IV) or mixture thereof with a sulfidizing agent in an organic polar solvent:

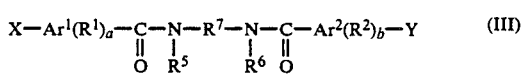

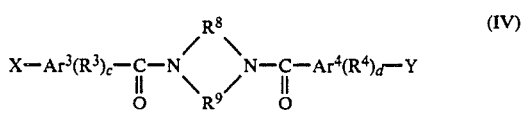

wherein Ar¹, Ar², Ar³ and Ar⁴ each represent an aromatic ring; R¹, R², R³, R⁴, R⁵ and R⁶, which are the same or different, each represent an alkyl group having 1 to 20 carbon atoms, a cycloalkyl group having 3 to 20 carbon atoms, an aryl group having 6 to 20 carbon atoms, an alkoxy group having 1 to 20 carbon atoms, an acyl group having 2 to 20 carbon atoms or an arylalkyl group having 7 to 20 carbon atoms, each of R⁵ and R⁶ optionally being hydrogen; a, b, c and d, which are the same or different, each represent an integer of from 0 to 4; R⁷, R⁸ and R⁹, which are the same or different, each represent an alkylene group having 1 to 20 carbon atoms; and X and Y, which are the same or different, each represent a halogen.

* * * * *